(No Model.)
E. B. WEST.
COMBINATION HARROW AND CULTIVATOR.
No. 502,059. Patented July 25, 1893.
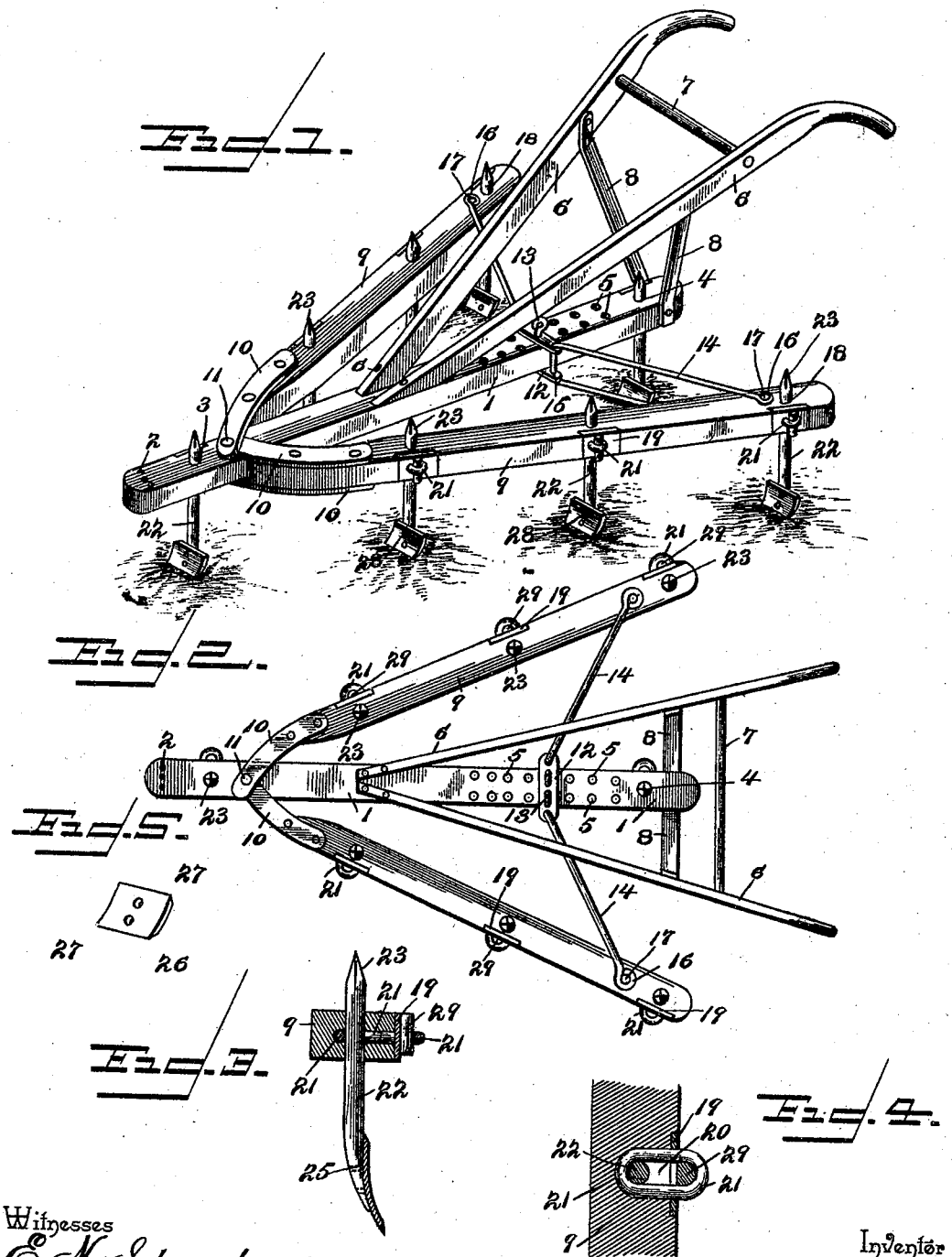

UNITED STATES PATENT OFFICE.

EDWARD B. WEST, OF SIMPSONVILLE, TEXAS, ASSIGNOR OF ONE-HALF TO THOMAS J. NELSON, OF SAME PLACE.

COMBINATION HARROW AND CULTIVATOR.

SPECIFICATION forming part of Letters Patent No. 502,059, dated July 25, 1893.

Application filed January 21, 1893. Serial No. 459,149. (No model.)

*To all whom it may concern:*

Be it known that I, EDWARD B. WEST, a citizen of the United States, residing at Simpsonville, in the county of Upshur and State of Texas, have invented a new and useful Combination Harrow and Cultivator, of which the following is a specification.

My invention has relation to agricultural implements, and has special reference to a combined harrow and cultivator; the objects in view being to provide a combination device adapted to serve as a harrow or as a cultivator and perform all the different functions of each, and to be readily changed from one to another without the use of hand-tools.

With these general objects in view the invention consists in certain features of construction hereinafter specified and particularly pointed out in the claims.

Referring to the drawings:—Figure 1 is a perspective view of an agricultural implement constructed in accordance with my invention. Fig. 2 is a plan view. Fig. 3 is a vertical transverse section through one of the harrow-beams or bars. Fig. 4 is a horizontal section through the same and a tooth. Fig. 5 is a detail of one of the cultivator blades.

Like numerals of reference indicate like parts in all the figures of the drawings.

In practicing my invention I employ a central-beam 1, the same being provided at its front end with, in this instance, a series of perforations 2, into any one of which an ordinary clevis may be secured, whereby the draft may be either straight or to one side of the center of the implement. In rear of the perforations the beam is provided with, in this instance, a cylindrical perforation or opening 3, and a similar perforation 4 is formed in the beam near the rear end thereof. Between the perforations 3 and 4 and in rear of the center of the beam a series of pairs of holes 5 are formed in said beam. A pair of handles 6 are bolted at their front ends to the beam, diverge, and extend to the rear, are connected by a rung 7 and supported by suitable braces 8.

9 designates a pair of opposite side or harrow-bars located at the opposite sides of the beam 1 and provided upon their upper and lower sides with curved metal-straps 10 whose front ends overlap the beam 1 and are pivoted thereto by a bolt 11, while their rear ends, as before stated, overlap the bars 9 and are securely bolted thereto.

A pair of metal plates 12 are located upon the upper and lower sides of the beam 1 and between their ends are provided with pairs of perforations, which are designed to align with the perforations or holes 5 in said beam. Through the medium of ordinary pins 13, the aforesaid plates 12 may be adjusted upon the beam. U-shaped bails 14 have their central vertical portions loosely journaled in perforations 15 formed in the ends of the plates 12, while their outer or free ends terminate in eyes 16, pivoted by means of bolts 17 to the harrow-bars 9, whereby it will be obvious an adjustment of the plates 12 will cause a pivotal movement of the bars 9 and either spread or contract the same as may be desired. It will also be seen that this may be accomplished without the employment of any wrenches or other tools.

Each of the bars 9 is provided with a series of, in this instance, cylindrical openings 18, which are similar to the openings 3 and 4 in the beam. Opposite these openings upon the outer sides of the bars there are let into the same metal bearing-plates 19, and the plates together with the bars at points registering with the openings 18, 3 and 4 are provided with horizontal slots 20 in which links 21 are located.

22 designates, in this instance, combined harrow-teeth and standards, and the same are preferably cylindrical, and are provided at one of their ends with points 23, while their opposite ends are curved and flared to form a different form of harrow-tooth 24, the latter having a pair of perforations 25.

26 designates a reversible shovel, and the same has the general shape of a rhomboid, thus providing the diagonally-opposite acute points 27.

If it is desired to employ the implement as a harrow, the teeth are introduced pointed end first through the upper ends of the openings 3, 4 and 18; or if on the other hand, it is desired to employ the implement as a cultivator, the pointed ends of the teeth are introduced upwardly through the said openings, By removing the bolts 28 that secure the shovels to the curved ends of the teeth, said shovels may be reversed so as to bring their opposite edges in contact with the ground. The teeth are passed through the links 21, and in order to secure the teeth in position, wedge-shaped keys 29, best shown in Figs. 3 and 4, are driven through the outer ends of the links and thus wedge themselves between said ends and the metal-wear plates.

It will be seen that the implement may be changed from the harrow to the cultivator in the field without the employment of a wrench, but the said operation would require simply a stone or other object with which the operator could hammer and loosen and drive the keys to position; whereas when nuts are employed, not only is a wrench required, but the machine being left out in the air becomes rusty and the nuts hard to loosen and apply.

By the peculiar shape of teeth a person may use in the ordinary way either the ordinary straight pointed tooth or the curved flared tooth, as the case may be, and in the latter case remove the shovels or bolts from the teeth. By withdrawing the front and rear teeth from their positions the cultivator may be employed for operating upon the sides of a furrow, or in other words, as a straddle-row cultivator. If it is desired to loosen up the ground without turning the same under, the shovel-plows are employed, the bolts being arranged in the first hole in the standard which permits the plow to sit flat upon the ground, as shown in Fig. 1. In breaking ground where it is desired to plow deep the same plow is employed, but the bolts are arranged in the upper hole of the foot.

From the foregoing description in connection with the accompanying drawings it will be seen that I have provided a cheap and simple construction of agricultural implement adapted to perform all the various functions of the different styles of plows or harrows, and capable of being converted from one to the other in a short time, and with but little labor.

Having described my invention, what I claim is—

1. In a machine of the class described, the combination with a beam having front and rear tooth-seats, teeth removably seated therein, handles carried by the beam, and a series of perforations or adjusting holes formed in the beam, of opposite bars provided with teeth hinged to the opposite sides of the beam, a perforated plate arranged on the upper and lower sides of the beam, pins removably located in the perforations of the plate and taking into those of the beam, and connections between the opposite ends of the plate and the bar, substantially as specified.

2. In a machine of the class described, the combination with a bar having a vertical opening and a horizontal slot communicating therewith, of a tooth mounted in the opening, a link located in the slot and receiving the tooth and having its eye projecting beyond the outer side of the bar, and a wedge-shaped key driven between the outer side of the bar and the link, substantially as specified.

In testimony that I claim the foregoing as my own I have hereto affixed my signature in the presence of two witnesses.

EDWARD B. WEST.

Witnesses:
 L. P. WILLIAMS,
 S. F. WILLIAMS.